May 17, 1966  B. R. BETTER  3,251,604
HYDRAULIC CHUCK
Filed March 18, 1964  3 Sheets-Sheet 1
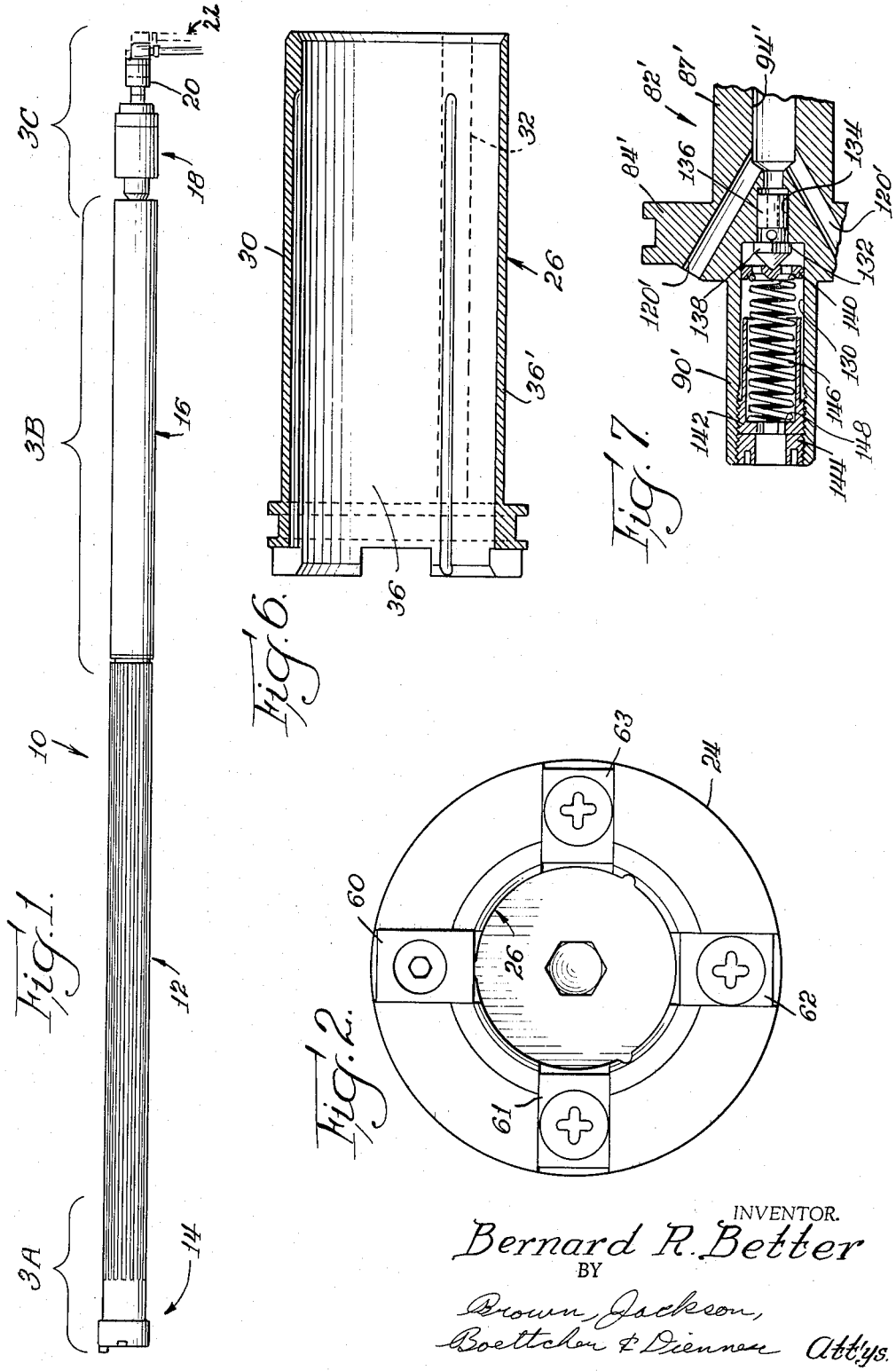
INVENTOR.
Bernard R. Better
BY
Brown, Jackson,
Boettcher & Dienner  Attys.

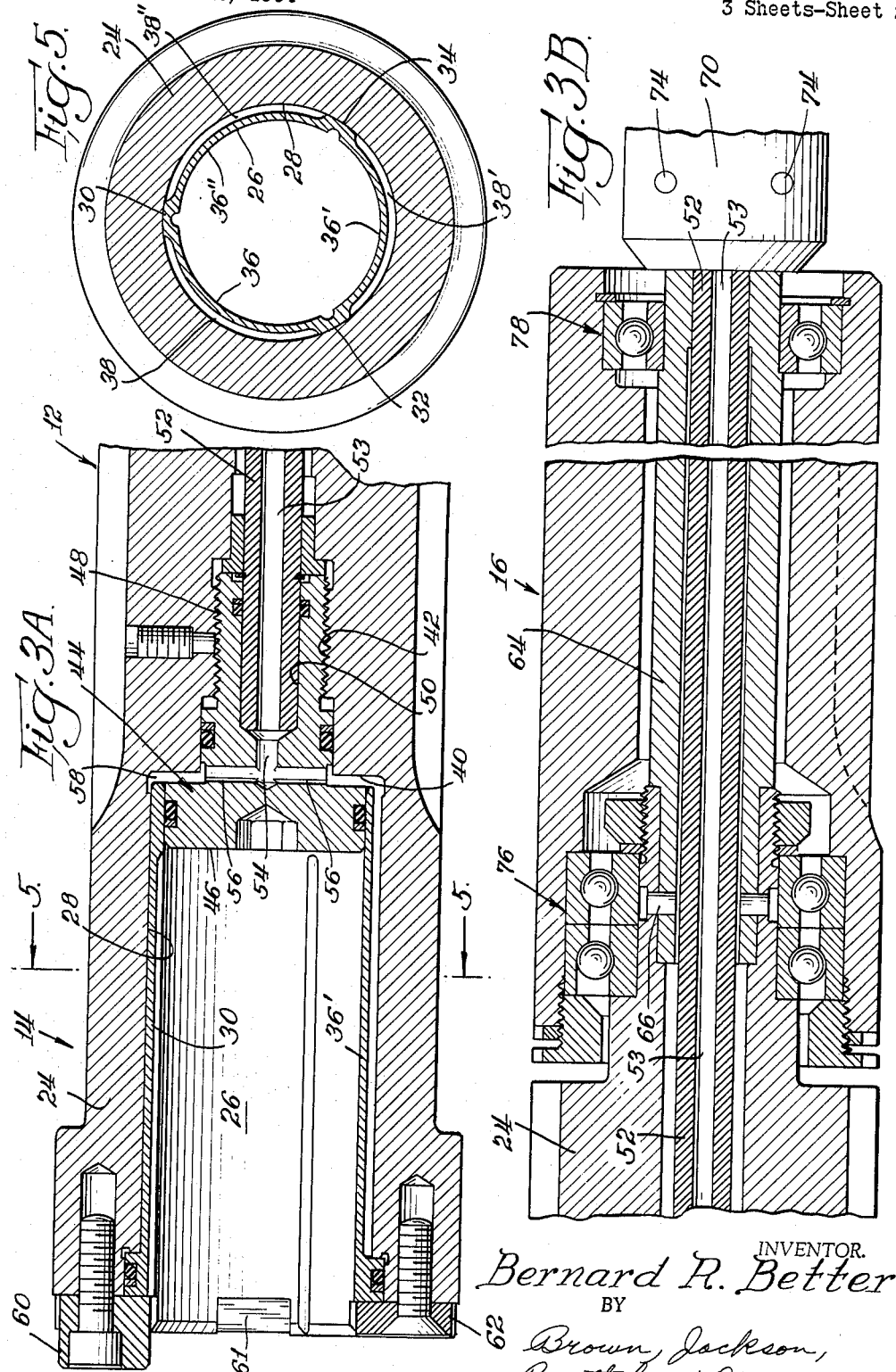

May 17, 1966     B. R. BETTER     3,251,604
HYDRAULIC CHUCK
Filed March 18, 1964     3 Sheets-Sheet 3
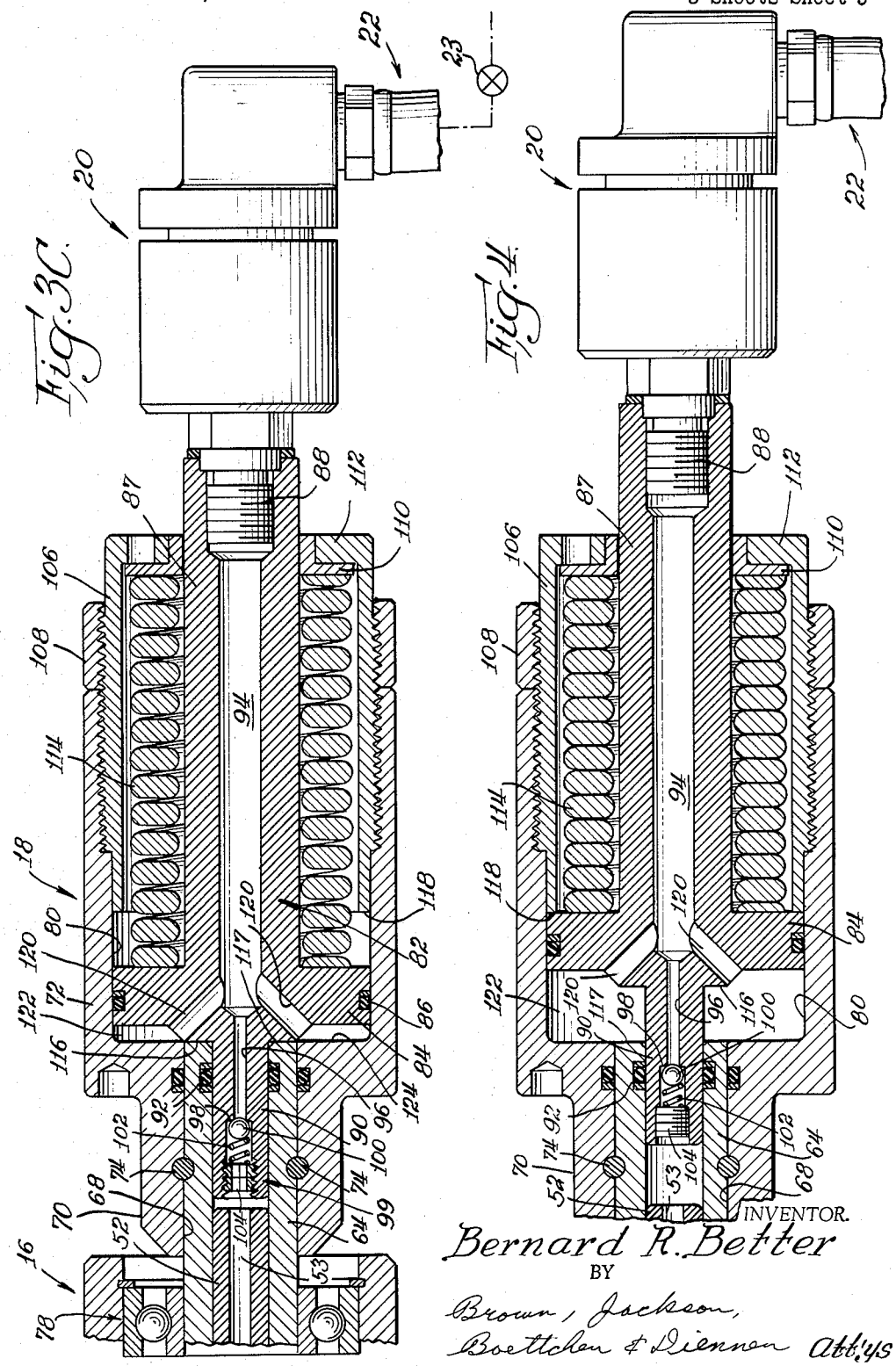
INVENTOR.
Bernard R. Better
BY
Brown, Jackson,
Boettcher & Dienner Att'ys

United States Patent Office 3,251,604
Patented May 17, 1966

3,251,604
HYDRAULIC CHUCK
Bernard R. Better, Chicago, Ill., assignor to Scully-Jones and Company, Chicago, Ill., a corporation of Illinois
Filed Mar. 18, 1964, Ser. No. 352,844
12 Claims. (Cl. 279—4)

The present invention relates to an improved hydraulic chuck for a machine tool spindle or the like. More specifically, the invention relates to a hydraulic chuck wherein a thin-walled generally tubular shell is mounted within a housing so as to define a pressure chamber therebetween, whereby when hydraulic fluid is supplied to the pressure chamber the shell is contracted radially inwardly to frictionally grip a tool disposed therein.

Various types of hydraulic chucks embodying thin-walled deformable shells have heretofore been proposed, but such known chucks have been subject to certain disadvantages, particularly with respect to the means for supplying hydraulic fluid to the chuck. Thus, it is common to connect a supply of hydraulic fluid under pressure to the chuck for creating an equal pressure in the chamber surrounding the thin-walled shell in order to contract the latter radially inwardly to grip a tool. In such a system, the tool is gripped by the chuck when the pressure supply is on, and the tool is released when the pressure is turned off. The foregoing arrangement requires that pressure be supplied continuously through a rotary coupling when the hydraulic spindle is rotating, and the pressure supplied through such coupling must be equal to the pressure required in the chamber surrounding the thin-walled shell in order to contract the latter sufficiently to effect gripping. In addition, if the pressure supply fails during rotation of the spindle, the tool in the chuck is released. Consequently, it is generally necessary with such known forms of hydraulic chucks to provide a source of relatively high pressure and to maintain the pressure supply operatively associated with the chuck through a rotary coupling whenever a member is to be gripped in the chuck.

It is an object of the present invention to provide a hydraulic chuck which is caused to grip a tool therein when the source of hydraulic pressure is disconnnected, and which releases the tool when the pressure supply is operative, thereby providing a substantially fail-safe system.

Another object of the invention is to provide a hydraulic chuck having a booster action whereby the pressure provided in the chamber surrounding the thin-walled shell of the chuck may be several times greater than the pressure at the source of supply.

A further one of my objects is to provide a hydraulic chuck as above-mentioned wherein the hydraulic fluid in a closed system, including the chamber surrounding the thin-walled shell is automatically replenished each time the pressure supply is operatively connected to the chuck.

Other objects and advantages of the invention will become apparent from the following detailed description taken in conjunction with the accompanying drawings in which:

FIGURE 1 is an elevational view of a hydraulic spindle equipped with a hydraulic chuck and means for supplying pressure thereto in accordance with the present invention;

FIGURE 2 is an enlarged end elevational view looking at the front end of the spindle of FIGURE 1;

FIGURE 3A is an enlarged fragmentary longitudinal sectional view of the forward end of the spindle of FIGURE 1 showing in particular the forward or chucking end of the spindle housing and a thin-walled flexible shell mounted therein for frictionally gripping a tool which is disposed in the shell;

FIGURE 3B is an enlarged fragmentary longitudinal sectional view of the axially intermediate portion of the spindle of FIGURE 1, the view being foreshortened for purposes of illustration;

FIGURE 3C is an enlarged fragmentary longitudinal sectional view of the rear end of the spindle of FIGURE 1 showing in particular the mechanism of the present invention for controlling the operation of the thin-walled shell of FIGURE 3A;

FIGURE 4 is a view similar to FIGURE 3C showing the control mechanism in an alternative position as when the pressure supply is operative and the hydraulic chuck is thereby caused to release a tool disposed therein;

FIGURE 5 is a transverse section, taken substantially along the line 5—5 of FIGURE 3A, showing a thin-walled shell having three lobes formed on the outer surface thereof, the shell being mounted within the spindle housing so as to define three separate pressure chambers between the shell and the housing;

FIGURE 6 is a detail longitudinal section of the thin-walled shell of FIGURE 3A; and FIGURE 7 is a fragmentary vertical sectional view of an adjustable poppet type check valve which may be substituted for the spring-loaded ball check valve shown in FIGURES 3C and 4.

Referring now to the drawings, FIGURE 1 shows a spindle 10 comprising a rotatable splined section 12 having a hydraulic chuck 14 at the forward end thereof, and a non-rotatable support housing 16. At the rear of the housing 16 there is a pressure control member 18 which is fixedly associated with the splined section 12 for rotation therewith, and a rotary coupling 20 is provided to connect the member 18 with a source of hydraulic fluid under pressure as indicated at 22. As shown schematically in FIGURE 3C, conventional valve means 23 is provided for opening and closing the supply line 22 in order to control the admission of hydraulic fluid under pressure. FIGURE 3A shows the hydraulic chuck 14 which comprises a housing 24, and a thin-walled shell 26 which is mounted within a large diameter bore 28 in the end of the housing. As best shown in FIGURE 5, the thin-walled shell 26 is provided with three external longitudinal lobes 30, 32 and 34 which are circumferentially spaced part 120 degrees and which engage the inner diameter 28 of the housing 24 so as to provide in effect a rigid connecting link between the shell and the housing. The shell 26 is thus comprised of three thin-walled sections 36, 36' and 36" which are separated by the three lobes, and three separate pressure chambers 38, 38' and 38" are defined between the foregoing wall sections and the inner diameter of the housing 24.

The rear end of the housing bore 28 terminates at an annular shoulder 40, and rearwardly of the shoulder 40 there is a threaded bore 42 of reduced diameter. A coupling indicated generally at 44 comprises a forwardly disposed disc portion 46 and a rearwardly extending threaded shank 48. The rear end of the shell 26 is engaged with the disc 46, and the coupling shank 48 is then threaded into the spindle housing. The coupling shank 48 has an axial bore 50 in which one end of a tubular extension 52 is disposed, and the bore 50 communicates with a smaller diameter passage 54 which in turn communicates with a plurality of radial fluid passages 56 which lead to a chamber 58 between the shoulder 40 and the rear end of the shell 26. Accordingly, hydraulic fluid which is supplied to a passage 53 in the tubular extension 52 will flow through the passages 54 and 56 and the chamber 58 into the pressure chambers 38, 38′ and 38″. When such hydraulic fluid is provided at a sufficiently high pressure, the thin-walled sections 36, 36′ and 36″ will be flexed radially inwardly to effect frictional gripping of a tool disposed in the hydraulic chuck 14.

The radially inward flexing of the thin-walled sections will tend to force the three lobes 30, 32 and 34 radially outwardly against the inner diameter 28 of the housing 24 so as to provide a greater frictional grip between the shell 26 and the housing to prevent any relative movement therebetween. In addition, four keys 60, 61, 62 and 63 (see FIGURE 2) are screwed to the forward end of the housing 24 so as to project radially inwardly into slots formed in the shell 26, thereby to retain the shell axially and also prevent rotation thereof. One of the keys 60 projects forwardly of the front of the housing 24 (see FIGURE 3A) for the purpose of projecting into a key slot in a tool or tool holder to provide for positive rotational drive thereof.

FIGURES 3B and 3C show a tubular connecting shaft 64. The forward end of the shaft 64 extends into the rear end of the spindle housing member 24 and is secured thereto by roll pins or the like such as shown at 66. The rear end of the tubular shaft 64 extends into a bore 68 formed in a hub portion 70 of a housing 72 for the pressure control mechanism 18, and the shaft 64 is secured to the hub 70 by roll pins 74. Accordingly, the forward spindle section 12 and the pressure control mechanism 18 are secured together for conjoint rotation by the tubular shaft 64, and such assembly is rotatably supported in the non-rotatable intermediate spindle section 16 by means of roller bearings indicated generally at 76 and 78 (see FIGURE 3B).

Reference is now made to FIGURES 3C and 4 which show the pressure control mechanism 18 for the hydraulic chuck of the present invention. The housing 72 is provided with a large diameter bore 80 within which a piston 82 is disposed for axial sliding movement therein. The piston 82 includes a disc-shaped portion 84 which is sealed relative to the housing 72 by means of an O-ring 86, and an integral rearwardly extending piston shaft 87 which receives at its rear end a threaded outlet fitting 88 of the rotary coupling 20. The piston 82 further includes a relatively small diameter nose portion 90 which is disposed within the rear of the tubular shaft 64 for sliding movement therein, the nose portion 90 being sealed relative to the tubular shaft 64 by an O-ring 92.

The piston shaft 87 has an axial bore 94 which communicates with a smaller diameter axial bore 96 in the piston nose portion 90. The forward end of the piston nose 90 is countersunk to provide an annular shoulder 98, and a spring-loaded ball check valve 99 is mounted within the piston nose to permit flow of hydraulic fluid in a forward direction only through the axial passage 96. A ball 100 is biased against the shoulder 98 by a compression spring 102, and the spring is adjustably held in position within the piston nose 90 by a pair of locknuts 104. It will now be understood that when hydraulic fluid under pressure is supplied from the conduit 22 through the rotary coupling 20, such fluid will flow through the piston passages 94 and 96 past the one way ball check valve 99 and into the passage 53 in the tubular extension 52, and as previously described the hydraulic fluid in the passage 53 will flow forwardly and then through passages 54 and 56 into the pressure chambers 38, 38′ and 38″ which surround the thin-walled shell portions 36, 36′ and 36″.

An adjustable spring housing 106 is threaded into the rear end of the pressure control housing 72 and is held in a predetermined axial position therein by a locknut 108. A guide bushing 110 is disposed inside the spring housing 106 at the rear end thereof and is retained by a radially inwardly projecting annular flange 112 which is formed integral with the rear end of the spring housing 106. A relatively large compression spring 114 is disposed within the spring housing 106 so as to surround the piston shaft 87. The compression spring 114 extends between the rear face of the disc-shaped piston member 84 and the guide bushing 110 and serves to bias the piston 82 to its forward axial position, as shown in FIGURE 3C.

When the piston 82 is in its forward axial position, an annular shoulder 116 at the rear of the nose portion 90 engages against the rear end 117 of the tubular shaft 64 to prevent further forward movement of the piston. When the piston 82 is moved axially rearwardly by means to be described hereinafter, it will stop when the rear face of the disc-shaped piston member 84 engages against the forward end 118 of the spring housing 106. It will be understood that the axial position of the spring housing 106 is adjustable so as to permit adjustment of the stroke of the piston 82. It will also be noted that a plurality of inclined fluid passages 120 are formed in the piston 82 so as to permit oil under pressure to flow from the axial passage 94 into an annular chamber 122 defined between a housing wall 124 and the forward face of the disc-shaped piston member 84, whereby when oil under pressure is supplied from the conduit 22, such oil will flow into the chamber 122 to move the piston 82 to its rearward position as shown in FIGURE 4.

In operation, when the spindle 10 is stopped, hydraulic fluid under pressure is supplied from the conduit 22 through the rotary coupling 20. While the pressure of such fluid may vary considerably in different applications, it may be a relatively low pressure due to a booster action provided by the mechanism of the present invention, and for purposes of illustration it will be assumed that the initial or priming pressure is 350 p.s.i. Consequently, the hydraulic fluid at a pressure of 350 p.s.i forces the ball 100 away from its seat and passes through the tubular extension 52 and passes 54 and 56 into the chamber 58, and from the chamber 58 such fluid passes into the three separate pressure chambers 38, 38′ and 38″ which surround the thin-walled shell 26. However, the pressure of 350 p.s.i. will not be large enough to flex the thin-walled shell portions 36, 36′ and 36″ radially inwardly sufficiently to effect gripping of a a tool disposed in the shell 26, and thus the hydraulic chuck will be in its released condition and a tool of the proper size may be freely inserted therein or removed therefrom. Hydraulic fluid at the initial or priming pressure of 350 p.s.i. also flows through the passages 120 into the chamber 122, and the force created by such fluid acts upon the piston 82 to move the latter axially rearwardly compressing spring 114 until the rear face of the disc-shaped piston member 84 engages the forward end 118 of the spring housing 106 as shown in FIGURE 4. It will thus be understood that the positions of the pressure control components as shown in FIGURE 4 correspond with the released condition of the hydraulic chuck 14.

When a tool has been positioned in the chuck 14 so as to have the shank thereof disposed within the shell 26, gripping of the tool is effected by turning off the pressure supply 22. When the pressure supply 22 is thus turned off, there is no force to hold the piston 82 in its rearward position of FIGURE 4, and thus the compressed spring 114 forces the piston to its forward axial position as shown in FIGURE 3C. When the piston thus moves forwardly, the nose portion 90 of the piston moves forwardly within the end of the tubular shaft 64 so as to further compress the fluid in the various passages and chambers forwardly of the one way ball check valve 99. In other words, the initial priming pressure of 350 p.s.i. fills all of the passages in the closed system forwardly of the valve 99 with oil or the like at a pressure of 350 p.s.i., which pressure is not sufficient to effect gripping of a tool in the chuck, and then the forward movement of the piston nose 90 further compresses such hydraulic fluid so as to substantially increase the pressure in the closed system.

In further explanation of the foregoing, it will be noted that the spring 114 was compressed by a force of 350 p.s.i. acting upon the relatively large area of the forward face of the disc-shaped piston member 84, and the force thus stored in the spring is thereafter applied at the relatively small cross sectional area of the piston nose 90. For example, the cross sectional area of the chamber 122 may be approximately ten times the cross sectional area of the piston nose 90, and thus when the piston moves from the position of FIGURE 4 to the position of FIGURE 3C, it will increase the pressure in the closed system forwardly of the ball check valve 99 from 350 p.s.i. to approximately 3500 p.s.i. Such an increase of the pressure in the chambers 38, 38' and 38" will flex the wall portions of the shell 26 radially inwardly to effect firm gripping of a tool or the like disposed therein. As previously indicated, a tool thus held in the chuck 14 will be released when the source of pressure 22 is again operatively connected to the system.

It will be understood from the foregoing that the hydraulic chuck of the present invention is essentially a fail-safe system since it is the spring 114 which effects gripping at the chuck, and release of a tool is effected through application of pressure. Thus, no pressure need be supplied to the chuck during rotation of the spindle, and loss of the pressure supply will not cause release of a member being held in the chuck as long as pressure is not lost in the closed portion of the system. It should also be noted that each time the chuck is released, the priming pressure of 350 p.s.i. is connected to the system, and if the pressure forwardly of the ball check valve 99 has become less than 350 p.s.i., the ball 100 will be displaced from its seat and the pressure in the closed system will be brought up to the priming pressure. Thus, the system is automatically replenishing, since the pressure in the closed portion of the system will automatically be replenished if necessary each time the chuck is operated. In addition, the booster action of the hydraulic system is advantageous since it permits use of a relatively low pressure source, and the low initial pressure is then increased several times by the operation of the piston 82 and compression spring 114. The operation of the piston 82 is substantially constant due to the fact that the initial pressure will always cause the piston to move rearwardly an amount sufficient to engage the stop 118, and thus the stroke of the piston will be constant regardless of minor variations in the pressure supply.

In some applications it may be that the available pressure source is sufficiently high that such priming pressure tends to cause the thin-walled shell portions 36, 36' and 36" to flex inwardly and interfere with insertion or removal of a tool. This will tend to be more of a problem with larger diameter shells which for a given wall thickness will be more flexible. In such instances, the pressure in the closed system can be limited by using a poppet type check valve as shown in FIGURE 7 in place of the ball check valve 99 shown in FIGURE 3C. Thus, there is shown a piston nose portion 90' having a bore 130 formed therein and terminating at a shoulder 132, and a reduced diameter passage 134 connects the bore 130 with a supply passage 94'. A poppet 136 is disposed in the passage 134 and is shown in its closed position wherein a head portion 138 thereon is seated against the shoulder 132. A spring washer 140 is positioned against the nose of the poppet 136, and a spring housing 142 is threaded into the bore 130 in the forward end of the piston nose 90' and is locked in a predetermined axial position by a jam nut 144. A compression spring 146 is positioned in the piston nose 90' so as to extend between the washer 140 and a supporting flange 148 on the spring housing 142, whereby the spring yieldingly urges the poppet 136 toward its closed position.

It will be understood that with the foregoing arrangement, the pressure in the closed system when the chuck 14 is in released condition can be limited to a value less than the pressure at the source of supply, and such pressure may be adjusted by adjusting the position of the spring housing 142. For example, it will be assumed that the poppet valve is set for 250 p.s.i., and that the pressure supply is 350 p.s.i. The pressure in the closed system will build up to 200 p.s.i., at which time the force generated by such pressure together with the force of the spring 146 will cause the poppet 136 to close, although of course the full pressure of 350 p.s.i. will be supplied to the chamber 122 shown in FIGURES 3C and 4.

While I have illustrated my invention in a preferred form, I do not intend to be limited to that form, except insofar as the appended claims are so limited, since modifications within the scope of my invention will readily occur to others, particularly with my disclosure before them.

I claim:

1. For use with a hydraulic chuck of the type having a hydraulically actuated thin-walled shell which is radially flexed to provide frictional gripping of a member to be held, a pressure control system comprising, in combination, a hydraulic fluid passage leading to a chamber adjacent said thin-walled shell, said passage and chamber normally being substantially filled with hydraulic fluid, sealing means associated with said passage to provide a closed system including said passage and said chamber, said sealing means including piston means associated with said passage for controlling the pressure in said closed system, said piston means being movable to a first position to reduce the pressure in said closed system to an initial pressure which is insufficient to cause said shell to grip a member disposed therein and being movable to a second position to substantially increase the initial pressure in said closed system to a level which is sufficient to cause said shell to grip a member disposed therein, spring means arranged to act on one side of said piston means for moving said piston means to said second position to effect gripping of a member disposed in said shell, and means for moving said piston means against the force of said spring means to said first position to effect release of a member disposed in said shell.

2. For use with a hydraulic chuck of the type having a hydraulically actuated thin-walled shell which is radially flexed to provide frictional gripping of a member to be held, a pressure control system comprising, in combination, a hydraulic fluid passage leading to a chamber adjacent said thin-walled shell, said passage and chamber normally being substantially filled with hydraulic fluid, sealing means associated with said passage to provide a closed system including said passage and said chamber, said sealing means including piston means associated with said passage for controlling the pressure in said closed system, said piston means being movable to a first position to reduce the pressure in said closed system to an initial pressure which is insufficient to cause said shell to grip a member disposed therein and being movable to a second position to substantially increase the initial pressure in said closed system to a level which is sufficient to cause said shell to grip a member disposed therein, spring means arranged to act on one side of said piston means for moving the same to said second position to effect gripping of a member disposed in said shell, supply means comprising a source of hydraulic fluid under pressure, means for turning said supply means on and off, and means connecting said supply means to the other side of said piston for moving the same against the force of said spring means to said first position to effect release of a member disposed in said shell.

3. For use with a hydraulic chuck of the type having a hydraulically actuated thin-wall shell which is radially flexed to provide frictional gripping of a member to be held, a pressure control system comprising, in combination, a hydraulic fluid passage leading to a chamber adjacent said thin-walled shell, said passage and chamber normally being substantially filled with hydraulic fluid, sealing means associated with said passage to provide a closed system including said passage and said chamber, said sealing means including piston means associated with said passage for controlling the pressure in said closed system, said piston means being movable to a first position to reduce the pressure in said closed system to an initial pressure which is insufficient to cause said shell to grip a member disposed therein and being movable to a second position to substantially increase the initial pressure in said closed system to a level which is sufficient to cause said shell to grip a member disposed therein, spring means arranged to act on one side of said piston means for moving the same to said second position to effect gripping of a member disposed in said shell, supply means comprising a source of hydraulic fluid under pressure, means for turning said supply means on and off, means connecting said supply means to the other side of said piston for moving the same against the force of said spring means to said first position to effect release of a member disposed in said shell, and means connecting said supply means to said closed system, whereby when said supply means is turned on a member disposed in said shell will be released and the supply of hydraulic fluid in said closed system will be replenished.

4. The invention of claim 3 wherein the means connecting said supply means to said closed system includes one-way valve means which permits fluid flow only into said closed system.

5. The invention of claim 4 wherein said valve means is adjustable to permit said initial pressure in said closed system to be limited to a predetermined amount which may be less than the pressure at said supply means.

6. For use with a hydraulic chuck of the type having a hydraulically actuated thin-walled shell which is radially flexed to provide frictional gripping of a member to be held, a pressure control system comprising, in combination, a hydraulic fluid passage leading to a chamber adjacent said thin-walled shell, said passage and chamber normally being substantially filled with hydraulic fluid, a piston housing, piston means including a relatively large diameter disc-shaped piston member axially slidable in said housing and further including a piston nose member of substantially reduced diameter projecting from said disc-shaped member, said piston nose member being positioned to project into said passage in sealing relationship therewith to provide a closed system including said passage and said chamber and by its position to control the pressure in said closed system, said piston means being movable to a first position to reduce the pressure in said closed system to an initial pressure which is insufficient to cause said shell to grip a member disposed therein and being movable to a second position to substantially increase the initial pressure in said closed system to a level which is sufficient to cause said shell to grip a member disposed therein, spring means arranged to act on one side of said piston means for moving said piston means to said second position to effect gripping of a member disposed in said shell, and means for moving said piston means against the force of said spring means to said first position to effect release of a member disposed in said shell.

7. For use with a hydraulic chuck of the type having a hydraulically actuated thin-wall shell which is radially flexed to provide frictional gripping of a member to be held, a pressure control system comprising, in combination, a hydraulic fluid passage leading to a chamber adjacent said thin-walled shell, said passage and chamber normally being substantially filled with hydraulic fluid, a piston housing, piston means including a relatively large diameter disc-shaped piston member axially slidable in said housing and further including a piston nose member of substantially reduced diameter projecting from said disc-shaped member, said piston nose member being positioned to project into said passage in sealing relationship therewith to provide a closed system including said passage and said chamber and by its position to control the pressure in said closed system, said piston means being movable to a first position to reduce the pressure in said closed system to an initial pressure which is insufficient to cause said shell to grip a member disposed therein and being movable to a second position to substantially increase the initial pressure in said closed system to a level which is sufficient to cause said shell to grip a member disposed therein, spring means arranged to act on one side of said disc-shaped piston member for moving said piston means to said second position to effect gripping of a member disposed in said shell, supply means comprising a source of hydraulic fluid under pressure, means for turning said supply means on and off, and means connecting said supply means to the other side of said disc-shaped piston member for moving said piston means against the force of said spring means to said first position to effect release of a member disposed in said shell.

8. For use with a hydraulic chuck of the type having a hydraulically actuated thin-wall shell which is radially flexed to provide frictional gripping of a member to be held, a pressure control system comprising, in combination, a hydraulic fluid passage leading to a chamber adjacent said thin-walled shell, said passage and chamber normally being substantially filld with hydraulic fluid, a piston housing, piston means including a relatively large diameter disc-shaped piston member axially slidable in said housing and further including a piston nose member of substantially reduced diameter projecting from said disc-shaped member, said piston nose member being positioned to project into said passage in sealing relationship therewith to provide a closed system including said passage and said chamber and by its position to control the pressure in said closed system, said piston means being movable to a first position to reduce the pressure in said closed system to an initial pressure which is insufficient to cause said shell to grip a member disposed therein and being movable to a second position to substantially increase the initial pressure in said closed system to a level which is sufficient to cause said shell to grip a member disposed therein, spring means arranged to act on one side of said disc-shaped piston member for moving said piston means to said second position to effect gripping of a member disposed in said shell, supply means comprising a source of hydraulic fluid under pressure, means for turning said supply means on and off, means connecting said supply means to the other side of said disc-shaped piston member for moving said piston means against the force of said spring means to said first position to effect release of a member disposed in said shell, and means for connecting said supply means to said closed system, whereby when said supply means is turned on a member disposed in said shell will be released and the supply of hydraulic fluid in said closed system will be replenished.

9. The invention of claim 8 wherein said first-mentioned passage in said closed system is connected to said supply means by a second passage which extends axially through said piston means, and wherein said supply means is connected to said other side of said disc-shaped piston member by a third passage which communicates with said second passage.

10. The invention of claim 9 wherein one-way valve means is disposed in said second passage to permit fluid flow only into said closed system, said valve means being positioned so as not to impede fluid flow in either direction through said third passage.

11. The invention of claim 8 wherein stop means is provided for stopping said piston means at a predetermined first position thereby to provide a constant stroke for said piston means.

12. The invention of claim 10 wherin said valve means is adjustable to permit said initial pressure in said closed system to be limited to a predetermined amount which may be less than the pressure at said supply means.

References Cited by the Examiner

UNITED STATES PATENTS

| | | | |
|---|---|---|---|
| 2,623,080 | 12/1952 | Young | 269—32 X |
| 3,034,408 | 5/1962 | Kampmeier | 279—4 X |
| 3,087,737 | 4/1963 | Werth | 279—4 |

LESTER M. SWINGLE, *Primary Examiner.*

ROBERT C. RIORDON, *Examiner.*

HAROLD V. STAHLHUTH, *Assistant Examiner.*